United States Patent [19]
Nardone et al.

[11] Patent Number: 5,586,471
[45] Date of Patent: Dec. 24, 1996

[54] ENERGY STORAGE FLYWHEEL DEVICE

[75] Inventors: Vincent C. Nardone, South Windsor; Mark S. Thompson, Vernon; Thomas G. Meyer, Lebanon, all of Conn.

[73] Assignee: United Technologies Corporation, Hartford, Conn.

[21] Appl. No.: 487,878

[22] Filed: Jun. 7, 1995

Related U.S. Application Data

[62] Division of Ser. No. 128,319, Sep. 29, 1993, Pat. No. 5,452,625.

[51] Int. Cl.$^6$ .................................................. F16F 15/30
[52] U.S. Cl. ....................... 74/572; 74/445; 156/60
[58] Field of Search ................... 156/60; 74/445, 74/572

[56] References Cited

U.S. PATENT DOCUMENTS

| | | | |
|---|---|---|---|
| 3,296,886 | 1/1967 | Reinhart, Jr. | 74/572 |
| 3,788,162 | 1/1974 | Rabenhorst et al. | 74/572 |
| 4,000,665 | 1/1977 | Rabenhorst | 74/572 |
| 4,102,221 | 7/1978 | Hatch | 74/572 |
| 4,134,759 | 1/1979 | Yajima et al. | 75/204 |
| 4,186,245 | 1/1980 | Gilman | 428/635 |
| 4,207,778 | 6/1980 | Hatch | 74/572 |
| 4,266,442 | 5/1981 | Zorzi | 74/572 |
| 4,370,899 | 2/1983 | Swartout | 74/572 |
| 4,413,860 | 11/1983 | Prescott | 301/63 |
| 4,481,840 | 11/1984 | Friedericy et al. | 74/572 |
| 4,502,349 | 3/1985 | Abiven et al. | 74/572 |
| 4,538,079 | 8/1985 | Nakayama et al. | 310/74 |
| 4,629,664 | 12/1986 | Matuska | 428/137 |
| 4,697,324 | 10/1987 | Grant et al. | 29/419 |
| 5,012,694 | 5/1991 | McGrath | 74/572 |
| 5,052,536 | 10/1991 | Maeda | 192/107 M |

FOREIGN PATENT DOCUMENTS 61-31739   2/1986   Japan.

OTHER PUBLICATIONS

English translation of the Publication of Unexamined Patent Application, Patent Number 61-31739; Miyata, Feb. 14, 1986.

Primary Examiner—Charles A. Marmor
Assistant Examiner—Sherry Lynn Estremsky
Attorney, Agent, or Firm—Pamela J. Curbelo

[57] ABSTRACT

The energy storage flywheel device (6) includes a plurality of annular shaped composite sections (8) and an annular shaped insert (10). The insert (10) has a specific radial strength substantially greater than the composite sections' specific radial strength. The composite sections (8) and the insert (10) are alternately stacked such that they have a common axis of rotation. They are bonded to each other such that shear stress is transferred between the composite sections (8) and insert (10). In some applications, the flywheel (6) may comprise at least one annular shaped metal matrix composite section (8).

15 Claims, 2 Drawing Sheets

ENERGY STORAGE FLYWHEEL DEVICE

This is a division of application Ser. No. 08/128,319 filed on Sep. 29, 1993, now U.S. Pat. No. 5,452,625.

TECHNICAL FIELD

The present invention relates generally to a flywheel device and more particularly to an energy storage flywheel device having improved radial strength.

BACKGROUND ART

The potential for using a flywheel as an energy storage medium is well known. From a materials technology standpoint, the primary factor that controls the energy storage efficiency of a flywheel system is the strength to density ratio of the material used for the flywheel. Conventionally, flywheels have been made of metals such as high strength steel. Steel, however, may not be a suitable material for a flywheel that must store large amounts of energy efficiently. Specific disadvantages of metallic flywheels include the high weight of the flywheel and the potential for dangerous fractures associated with rotating the flywheel at high speeds. In addition, conventional metals are not well suited for high energy flywheels because their high density results in excessive loading during operation at high rim velocities.

Due to the disadvantages of metallic flywheels, wound fiber reinforced resin matrix composite flywheels have been developed. Such flywheels, which have circumferentially-oriented fibers, have the potential for achieving high strength to density ratios in the direction of fiber reinforcement because of the availability of high strength, low density fibers. Although resin matrix composites can achieve high hoop strength (strength parallel to the fiber direction), the mechanical properties of the composites are very anisotropic. For example, unidirectional resin matrix composites may possess hoop strengths between about 1000 MPa to about 2500 MPa, while the radial strength (strength perpendicular to the fiber direction) of these composites may be only between about 10 MPa to about 20 MPa. This anisotropic behavior limits the use of resin matrix composites for flywheels. In many potential flywheel designs, particularly high speed flywheels, the flywheel's radial strength is exceeded prior to achieving full utilization of the inherent high hoop strength of the flywheel. As a result fractures occur, making the flywheel unsuitable for many high speed applications.

Therefore, there exists a need for an energy storage flywheel device capable of achieving improved radial strength while maintaining sufficient hoop strength for operation at high rim velocities (e.g., 600 meters per second or greater).

DISCLOSURE OF THE INVENTION

The present invention relates to an energy storage flywheel device that achieves improved flywheel radial strength while maintaining sufficient hoop strength for operation at high speeds.

One aspect of the invention includes an energy storage flywheel device having a flywheel that includes a plurality of annular shaped composite sections and annular shaped inserts, wherein the insert and composite section are shaped to form annular interlocking features that provide a mechanical bond therebetween. The inserts have a specific radial strength substantially greater than the composite sections' specific radial strength. The composite sections and the inserts are alternately stacked such that they have a common axis of rotation. They are bonded to each other such that shear stress is transferred between the composite sections and insert. In operation, the flywheel may be mounted on a shaft.

Another aspect of the invention includes a energy storage flywheel device having a flywheel that includes at least one annular shaped metal matrix composite section.

These and other features and advantages of the present invention will become more apparent from the following description and accompanying drawing.

BEST MODE FOR CARRYING OUT THE INVENTION

Figure 1:
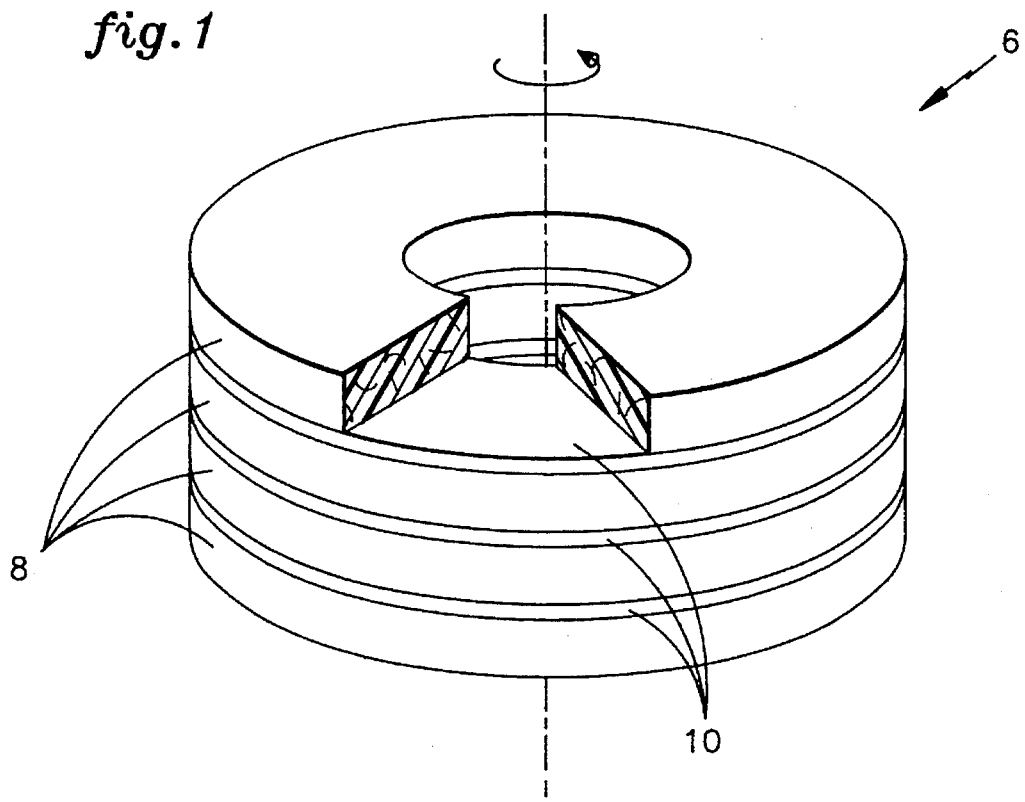
FIG. 1 is a perspective view of an energy storage flywheel device of the present invention.

The energy storage flywheel device 6 of FIG. 1 achieves greater flywheel radial strength than prior art composite flywheels by alternately stacking a plurality of annular shaped composite sections 8 with at least one annular shaped insert 10. For example, as shown in FIG. 1, each insert 10 may be disposed between two composite sections 8.

The composite sections 8 may comprise any anisotropic material suitable for flywheel fabrication such as wound fiber reinforced resin matrix composites or metal matrix composites. If the composite is a resin matrix composite, thermosetting or thermoplastic resins are suitable for the matrix. If the composite is a metal matrix composite, metals such as Al, Mg, or Ti may be used as the matrix. Preferably, the metal will be either Al or Mg because of their relatively low densities.

The composite sections 8 also may comprise any conventional fibers compatible with the matrix. For example, if the matrix is a resin matrix, the fibers may be carbon fibers, glass fibers, aramid fibers, or any other fiber compatible with the matrix. If the matrix is a metal matrix, the fibers may be graphite fibers, alumina fibers, silicon carbide fibers, boron fibers, or any other fibers compatible with the matrix. If desired, the fibers may be coated to make them compatible with the matrix. The fibers may be oriented in the matrix in any way that gives the flywheel 6 sufficient hoop strength for a desired application. The composite sections 8 should be the major constituent of the flywheel 6 to provide sufficient hoop strength. For example, the composite sections 8 may make up about 75% to about 98% by volume of the flywheel 6. In some applications in which the composite sections 8 comprise a metal matrix composite, the inserts 10 may be dispensed with entirely and the entire flywheel 6 may be made from the metal matrix composite because of the inherent higher radial strength provided by the metal matrix.

The insert 10 may comprise any material with a specific radial strength substantially greater than the specific radial strength of the composite sections 8. For purposes of this application, substantially greater means at least 5 times as great. Specific strength is defined as the ratio of the material's strength to its density. For example, the insert 10 may be a monolithic metal, a metal matrix composite, or a resin matrix composite. Preferably, the insert will comprise Al, an Al alloy, Ti, a Ti alloy, Ni, a Ni alloy, or steel. Most preferably, the insert 10 will be a Ti alloy because of its high radial strength, low density, and low to moderate cost. A small percentage of inserts 10 in the flywheel 6 may increase the radial strength substantially, while only slightly decreasing the hoop strength. For example, a flywheel 6 that comprises about 5% by volume to about 15% by volume of inserts 10 may be suitable for many applications.

In a preferred embodiment, the specific radial elastic modulus of the insert 10 will be greater than the specific radial elastic modulus of the composites sections 8, so that load transfers from the composite sections 8 in the radial direction to the insert 10. This prevents loading of the composite section 8 in the radial direction to the point where failure can occur. Specific elastic modulus (or specific stiffness, another term for the same parameter) is defined as the ratio of the material's elastic modulus to its density. Similarly, the specific hoop elastic modulus of the composite sections 8 should be greater than the specific hoop elastic modulus of the insert 10, so that load is transferred from the insert 10 to the composite sections 8 in the hoop direction. This prevents loading of the insert in the hoop direction to the point where failure can occur. The composite sections also should have a specific hoop strength substantially greater than the specific hoop strength of the insert 10.

The composite sections 8 and insert 10 may be made with any suitable conventional techniques. After fabrication, the composite sections 8 and the insert 10 are alternately stacked such that they have a common axis of rotation. Additionally, the composite sections 8 and insert 10 are bonded together such that shear stress and load are transferred between the composite sections 8 and insert 10.

Figure 2:
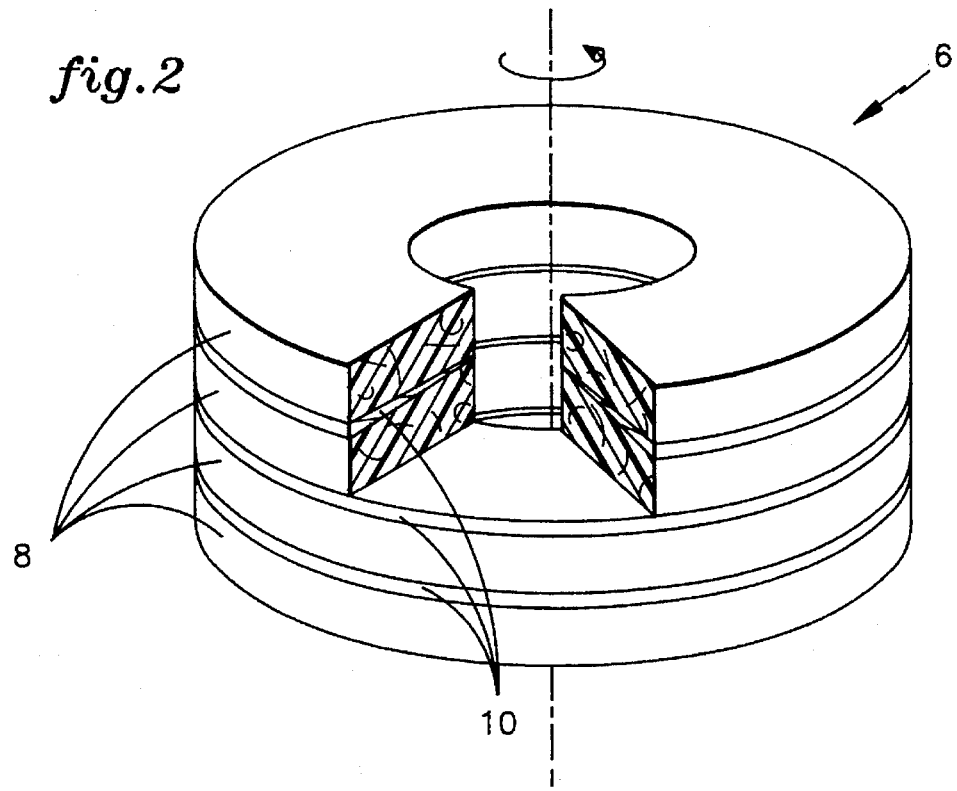
FIG. 2 is a perspective view of another energy storage flywheel device of the present invention including an insert that has a wedge-shaped cross-section.

Any conventionally known method for bonding may be used to bond the composite sections 8 to the insert 10. For example, diffusion bonding, mechanical bonding, and adhesive bonding techniques may be employed. Similarly, a combination of any of the above techniques may be suitable. As shown in FIG. 2, an insert 10 with a wedge-shaped cross-section that is thicker at its outer diameter than at its inner diameter may be used to mechanically bond the insert 10 to the composite sections 8.

Figure 3:
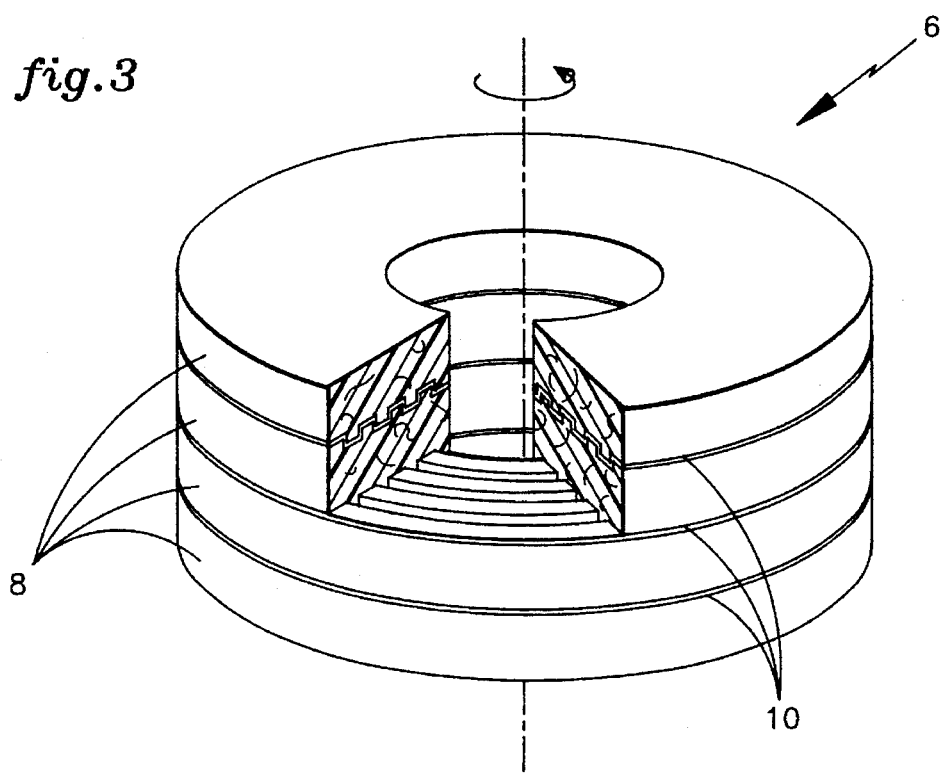
FIG. 3 is perspective view of another energy storage flywheel device of the present invention including interlocking features.

In another embodiment shown in FIG. 3, the insert 10 and composite sections 8 may be shaped to form interlocking features, such as teeth, that provide a mechanical bond between the insert 10 and composite sections 8. Adhesive disposed between the insert 10 and composite sections 8 also may be used to improve the bond between the interlocking teeth.

Figure 4:
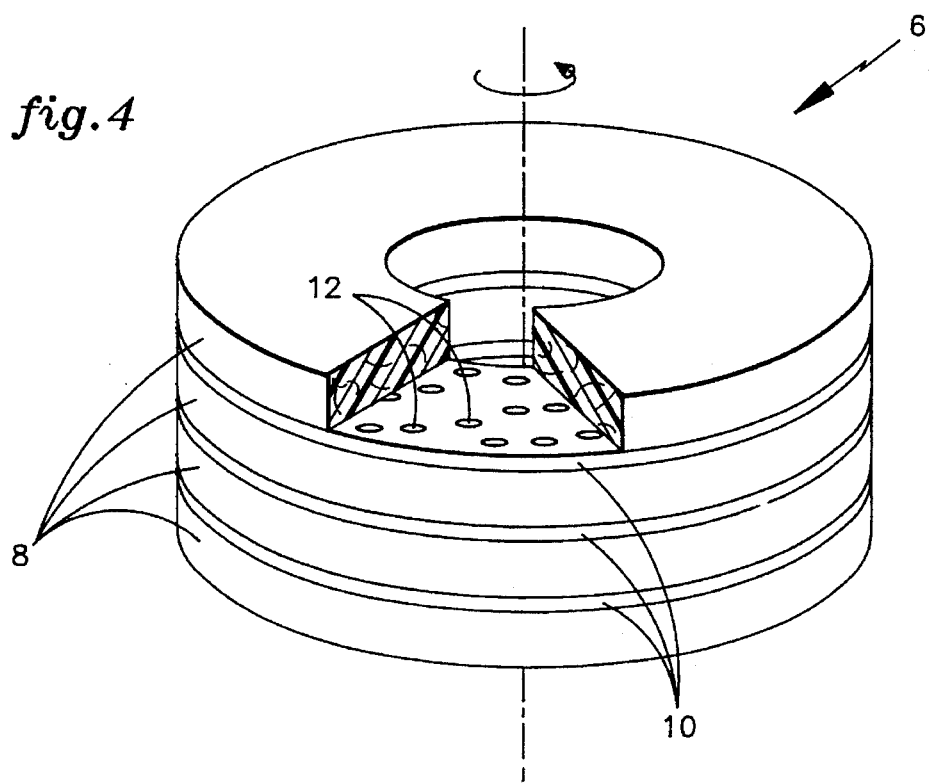
FIG. 4 is a perspective view of another energy storage flywheel device of the present invention further including a plurality of apertures filled with a material that bonds the composite sections to each other and the insert.

As shown in FIG. 4, the insert 10 may comprise a plurality of apertures 12 filled with adhesive to bond the composite sections 8 to the insert 10. Alternately, if the insert 10 is integrally cast within a metal matrix composite flywheel, these apertures can initially be left untilled to allow metal to flow between the composite sections 8. After final solidification of the metal matrix composite, metal that flows through the apertures 12 will form an integral metal network that bonds the composite sections 8 to each other and the insert 10.

The following example illustrates some advantages of the present invention without limiting the invention's broad scope.

EXAMPLE

A flywheel may be constructed by sandwiching a plurality of annular shaped inserts comprising an alloy of 6% Al, 4% V, balance Ti between a plurality of annular shaped wound fiber reinforced resin matrix composite sections. The composite sections may comprise 50 volume percent (vol %) T800 graphite fiber (Amoco Performance Products, Inc., Atlanta, Ga.) and 50 vol % epoxy matrix. The composite sections and inserts, which may be made with any of the conventional techniques described above, may be bonded together with any of the techniques described above such that the composite sections comprise about 95% by volume of the flywheel and the inserts comprise about 5% by volume of the flywheel.

Table 1 shows properties of the flywheel materials, Ti-6Al-4V and T800/epoxy composite. Bonding annular sections of these materials in a flywheel construction such that shear stress is transferred between the composite sections and insert can increase radial strength significantly while only slightly decreasing hoop strength. As shown in Table 2, the addition of the Ti-6Al-4V inserts may result in a 685% improvement in the flywheel radial strength, with only a 3% decrease in the flywheel hoop strength. The overall volume percent and number of the Ti-6Al-4V inserts could be tailored to meet specific design and fabrication requirements.

TABLE 1

| Material | Density (g/cm$^3$) | Hoop strength (MPa) | Radial strength (MPa) | Hoop strenth/ Density (MPa-cm$^3$)/g) |
| --- | --- | --- | --- | --- |
| T800/epoxy composite | 1.58 | 2760 | 7 | 1746 |
| Ti-6Al-4V insert | 4.44 | 966 | 966 | 218 |

TABLE 2

| Material | Density (g/cm$^3$) | Hoop strength (MPa) | Radial strength (MPa) | Hoop strength/ Density (MPa-cm$^3$)/g) |
| --- | --- | --- | --- | --- |
| 5 vol % Ti-6Al-4V inserts/ 95 vol % T800/epoxy composite | 1.72 | 2670 | 55 | 1553 |

This improvement over the prior art offers significant design advantages due to the increased radial strength of the flywheel. Thus, the present invention includes a light weight, energy storage flywheel device having greater radial strength than prior art composite flywheels while maintaining sufficient hoop strength for operation at high speeds.

The invention is not limited to the particular embodiments shown and described herein. Various changes and modifications may be made without departing from the spirit or scope of the claimed invention.

We claim:

1. An energy storage flywheel device, comprising:

(a) at least one annular shaped composite section, and, (b) at least one annular shaped insert having a specific radial strength substantially greater than the composite section's specific radial strength, wherein the insert and composite section are shaped to form interlocking features that provide a mechanical bond between the insert and composite section, wherein the insert comprises a monolithic metal selected from the group consisting of Al, Al alloys, Ti, Ti alloys, Ni, Ni alloys, and steel, wherein the composite section, and the insert are alternately stacked along a common axis such that they have a common axis of rotation and are bonded to each other such that radial load transfers between the composite section and insert.

2. The device of claim 1 wherein the insert has a specific radial elastic modulus greater than the specific radial elastic modulus of the composite sections.

3. The device of claim 1 wherein the composite sections have a specific hoop strength substantially greater than the specific hoop strength of the insert.

4. The device of claim 1 wherein the composite sections comprise a metal matrix composite.

5. The device of claim 4 wherein the metal matrix composite comprises a matrix selected from the group consisting of Mg, Al, and Ti.

6. The device of claim 4 wherein the metal matrix composite comprises reinforcing fibers selected from the group consisting of graphite fibers, alumina fibers, silicon carbide fibers, and boron fibers.

7. The device of claim 1 wherein the composite sections comprise a resin matrix composite.

8. The device of claim 7 wherein the resin matrix composite comprises reinforcing fibers selected from the group consisting of carbon fibers, glass fibers, and aramid fibers.

9. The device of claim 1 further comprising an adhesive disposed between the insert and composite sections.

10. An energy storage flywheel device, comprising:

(a) at least one annular shaped composite section, and (b) at least one annular shaped insert having a specific radial strength substantially greater than the composite section's specific radial strength, wherein the insert and composite section are shaped to form interlocking features that provide a mechanical bond between the insert and composite section, and wherein the insert comprises an alloy of 6% Al, 4% V, balance Ti and the composite sections comprise graphite fibers dispersed in an epoxy matrix, wherein the composite section and the insert are alternately stacked along a common axis such that they have a common axis of rotation and are bonded to each other such that radial load transfers between the composite section and insert.

11. The device of claim 10 wherein the insert has a specific radial elastic modulus greater than the specific radial elastic modulus of the composite section.

12. The device of claim 10 wherein the composite section has a specific hoop strength substantially greater than the specific hoop strength of the insert.

13. The device of claim 10 wherein the composite section comprises a metal matrix composite.

14. The device of claim 10 wherein the composite section comprise a resin matrix composite.

15. The device of claim 14 wherein the resin matrix composite comprises reinforcing fibers selected from the group consisting of carbon fibers, glass fibers, and aramid fibers.

* * * * *